US011948489B2

(12) United States Patent
Meng et al.

(10) Patent No.: US 11,948,489 B2
(45) Date of Patent: Apr. 2, 2024

(54) DISPLAY PANEL, DISPLAY DEVICE AND DRIVING METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhaohui Meng, Beijing (CN); Wei Sun, Beijing (CN); Wenchao Han, Beijing (CN); Hong Yang, Beijing (CN); Lin Cong, Beijing (CN); Wenjun Xiao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/137,010

(22) Filed: Apr. 20, 2023

(65) Prior Publication Data

US 2023/0260442 A1 Aug. 17, 2023

Related U.S. Application Data

(63) Continuation of application No. 16/957,575, filed as application No. PCT/CN2019/098700 on Jul. 31, 2019, now Pat. No. 11,715,401.

(51) Int. Cl.
*G09G 3/20* (2006.01)

(52) U.S. Cl.
CPC ....... *G09G 3/20* (2013.01); *G09G 2310/0254* (2013.01); *G09G 2310/0267* (2013.01);
(Continued)

(58) Field of Classification Search
CPC ... G09G 2310/0286; G09G 2310/0281; G09G 3/20; G09G 3/3266
See application file for complete search history.

(56) References Cited

U.S. PATENT DOCUMENTS

2004/0179014 A1 9/2004 Nakano et al.
2015/0091783 A1 4/2015 Hwang
(Continued)

FOREIGN PATENT DOCUMENTS

CN 2004264476 9/2004
CN 105845066 8/2016
(Continued)

OTHER PUBLICATIONS

Partial European Search Report, issued by the European Patent Office in corresponding European application No. 199331196.8, dated Jul. 11, 2022.
(Continued)

*Primary Examiner* — Gerald Johnson
(74) *Attorney, Agent, or Firm* — Leason Ellis LLP

(57) ABSTRACT

A display panel, a display device and a driving method. The display panel includes a display region and a peripheral region. The display region includes a subpixel unit array having a plurality of rows and a plurality of columns of subpixel units, and the peripheral region includes a gate drive circuit. The display region further includes a plurality of gate lines and a plurality of data lines. The gate drive circuit comprises a plurality of shift register units, and the plurality of gate lines are electrically connected with the plurality of shift register units. The gate drive circuit comprises two shift-register-unit scanning groups, in the shift-register-unit scanning groups, a (k+1)th shift register unit and a (k)th shift register unit form one shift register unit group.

20 Claims, 15 Drawing Sheets

(52) U.S. Cl.
CPC ............... *G09G 2310/0275* (2013.01); *G09G 2310/0286* (2013.01); *G09G 2310/08* (2013.01); *G09G 2320/02* (2013.01)

(56) References Cited

U.S. PATENT DOCUMENTS

| | | | |
|---|---|---|---|
| 2015/0109347 A1 | 4/2015 | Wen et al. | |
| 2015/0213772 A1 | 7/2015 | Tung et al. | |
| 2016/0155401 A1 | 6/2016 | Lee et al. | |
| 2018/0114506 A1* | 4/2018 | Takahashi | G06F 3/04166 |
| 2018/0166001 A1 | 6/2018 | Chen et al. | |
| 2018/0204499 A1 | 7/2018 | Bae et al. | |

FOREIGN PATENT DOCUMENTS

| | | |
|---|---|---|
| CN | 109817150 | 5/2019 |
| CN | 109817150 A | 5/2019 |
| CN | 110379390 | 10/2019 |
| WO | 2014000393 | 1/2014 |
| WO | 2016188257 | 12/2016 |

OTHER PUBLICATIONS

Extended European Sear Report for corresponding European Application No. 19933196.8, dated Nov. 21, 2022.

Non-Final Office Action for related U.S. Appl. No. 16/957,575, dated Dec. 7, 2022.

Notice of Allowance for related U.S. Appl. No. 16/957,575, dated Mar. 16, 2023.

International Search Report and Written Opinion with English translation for related International Application No. PCT/CN2019/098700, dated Apr. 26, 2020.

* cited by examiner

DISPLAY PANEL, DISPLAY DEVICE AND DRIVING METHOD

This application is a continuation application of U.S. patent application Ser. No. 16/957,575 filed on Jun. 24, 2020, which is a U.S. National Phase Entry of International Application No. PCT/CN2019/098700 filed Jul. 31, 2019. The above-identified applications are incorporated by reference herein in their entirety.

TECHNICAL FIELD

Embodiments of the present disclosure relate to a display panel, a display device and a driving method.

BACKGROUND

In the field of display technology, in order to improve the quality of displayed images and user experiences, the implementation of high PPI (Pixels Per Inch) and narrow bezel gradually becomes a research direction. In recent years, with the continuous improvement of the manufacturing technology of an amorphous-silicon thin film transistor or an oxide thin film transistor, a drive circuit may be directly integrated on a thin film transistor array substrate to form a GOA (Gate driver On Array) for driving a display panel. The GOA technology contributes to the implementation of the narrow bezel of the display panel, and may reduce the production cost of the display panel.

SUMMARY

At least one embodiment of the present disclosure provides a display panel, which includes a display region and a peripheral region. The display region comprises a subpixel unit array having a plurality of rows and a plurality of columns of subpixel units, and the peripheral region comprises a gate drive circuit. The display region further comprises a plurality of gate lines and a plurality of data lines. The gate drive circuit comprises a plurality of shift register units arranged in sequence, and the plurality of gate lines are electrically connected with the plurality of shift register units. The gate drive circuit comprises two shift-register-unit scanning groups. In the shift-register-unit scanning groups, a (k+1)th shift register unit and a (k)th shift register unit form one shift register unit group. The (k)th shift register unit in one of the shift-register-unit scanning groups and the (k+1)th shift register unit in another of the shift-register-unit scanning groups are connected.

For example, in the display panel according to an embodiment of the present disclosure, one gate line is provided at each of two sides of a row of subpixel units, and the row of subpixel units is connected with the two gate lines provided at the two sides.

For example, in the display panel according to an embodiment of the present disclosure, the plurality of subpixel units connected with the same data line in sequence have at least a first color and a second color.

For example, in the display panel according to an embodiment of the present disclosure, the plurality of shift register unit comprises a first transistor, a second transistor, a third transistor, a fourth transistor, a first electrode of the first transistor is connected with a clock signal, and a second electrode of the first transistor is connected with a first electrode of the second transistor. A first electrode of the third transistor, a second electrode of the fourth transistor and a gate electrode of the first transistor are connected with a pull-up node. A first electrode of the fourth transistor is connected with a gate electrode of the fourth transistor.

For example, in the display panel according to an embodiment of the present disclosure, the first electrode of the fourth transistor is connected with an output end of the shift register unit of a previous row, to receive a scanning signal as an input signal and an input control signal, and a gate electrode of the second transistor and a gate electrode of the third transistor are connected with an output end of the shift register unit of a next row to receive a scanning signal as an output pull-down control signal.

For example, in the display panel according to an embodiment of the present disclosure, the shift register unit further comprises a storage capacitor, the storage capacitor has an end connected with the gate electrode of the first transistor and the pull-up node and another end connected with a second electrode of the first transistor. A gate electrode of the third transistor is connected with a gate electrode of the second transistor; a second electrode of the second transistor is connected with a low level signal.

At least one embodiment of the present disclosure provides a display panel, which includes a display region and a peripheral region. The display region comprises a subpixel unit array having a plurality of rows and a plurality of columns of subpixel units, and the peripheral region comprises a gate drive circuit. The display region further comprises a plurality of gate lines and a plurality of data lines for driving the subpixel unit array, each subpixel unit is driven by a scanning signal provided by one gate line of the plurality of gate lines and a data signal provided by one data line of the plurality of data lines to display, and a same data line is connected with at least two subpixel units which are not adjacent to each other and have a same color. The gate drive circuit comprises a plurality of shift register units arranged in sequence, and the plurality of gate lines are arranged in sequence and electrically connected with the plurality of shift register units arranged in sequence, the plurality of shift register units are divided into at least one shift-register-unit scanning group. The gate drive circuit is configured to receive clock signals and generate the scanning signal to enable the at least two subpixel units of the same color which are connected with the same data line and not adjacent to each other to display successively in timing. The subpixel unit array is divided into at least one subpixel-unit scanning group, the at least one subpixel-unit scanning group is in a one-to-one correspondence with the at least one shift-register-unit scanning group. A qth row of subpixel units in each of the at least one subpixel-unit scanning group is electrically connected with a (2q−1)th shift register unit and a (2q)th shift register unit in the shift-register-unit scanning group corresponding to the subpixel-unit scanning group, and q is an integer greater than or equal to 1.

For example, in the display panel according to an embodiment of the present disclosure, a plurality of subpixel units connected with the same data line in sequence are divided into G driving groups when driven, a number of the clock signals is H, each of the driving groups comprises F subpixel units, F=[H/G], and [H/G] denotes rounding H/G. The gate drive circuit is further configured to enable F subpixel units in a Bth driving group to be driven in an order of $A_d=B+(d-1)\times G$, $A_d$ denotes an order number of the subpixel unit which is driven for a dth time, B is a positive integer less than or equal to G, and d is a positive integer less than or equal to F.

For example, in the display panel according to an embodiment of the present disclosure, the plurality of subpixel units connected with the same data line in sequence have at least a first color and a second color. Among the plurality of subpixel units connected with the same data line in sequence, the subpixel units of the first color have a minimum arrangement period of G1, the subpixel units of the second color have a minimum arrangement period of G2, and then G is a least common multiple of G1 and G2.

For example, in the display panel according to an embodiment of the present disclosure, each of the shift-register-unit scanning group comprises 16 shift register units, the clock signals received by the 16 shift register units are a first clock signal to a sixteenth clock signal, and the first clock signal to the sixteenth clock signal have equal periods and equal duty ratios.

For example, in the display panel according to an embodiment of the present disclosure, the period comprises 16 time units, and the first, fifth, ninth, thirteenth, third, seventh, eleventh and fifteenth clock signals are adjacent to each other in sequence in timing. The second, sixth, tenth, fourteenth, fourth, eighth, twelfth and sixteenth clock signals are adjacent to each other in sequence in timing. The first and second clock signals differ in timing by 8 time units.

For example, in the display panel according to an embodiment of the present disclosure, the duty ratio is 9/20.

For example, in the display panel according to an embodiment of the present disclosure, the display panel further comprises a data drive circuit in the peripheral region, and the data drive circuit is connected with the plurality of data lines and configured to supply the data signal to the subpixel unit array by means of a 2-point polarity switching approach.

For example, in the display panel according to an embodiment of the present disclosure, the data signal provided by any one of the plurality of data lines has a same polarity, and the any one of the plurality of data lines has a zigzag wiring shape.

For example, in the display panel according to an embodiment of the present disclosure, in each of the at least one shift-register-unit scanning group, a Lth shift register unit is provided at a first side of the display region, a Rth shift register unit is provided at a second side of the display region opposite to the first side; and L is 1, 2, 3, 4, 9, 10, 11 or 12, and R is 5, 6, 7, 8, 13, 14, 15 or 16.

At least one embodiment of the present disclosure further provides a display device, which includes any one of the display panels provided by the embodiments of the present disclosure.

At least one embodiment of the present disclosure further provides a driving method of any one of the display panels provided by the embodiments of the present disclosure, which includes: providing the clock signals to the gate drive circuit to cause the gate drive circuit to generate the scanning signal, to enable the at least two subpixel units of the same color which are connected with the same data line and not adjacent to each other to display successively in timing.

For example, in the driving method provided by an embodiment of the present disclosure, a plurality of subpixel units connected with the same data line in sequence are divided into G driving groups when driven, a number of the clock signals is H, each of the driving groups comprises F subpixel units, F=[H/G], and [H/G] denotes rounding H/G; and the driving method further comprises: driving F subpixel units in a Bth driving group in an order of Ad=B+(d−1)×G, where Ad denotes an order number of the subpixel unit which is driven for a dth time, B is a positive integer less than or equal to G, and d is a positive integer less than or equal to F.

For example, in the driving method provided by an embodiment of the present disclosure, the plurality of subpixel units connected with the same data line in sequence have at least a first color and a second color; among the plurality of subpixel units connected with the same data line sequentially, the subpixel units of the first color have a minimum arrangement period of G1, the subpixel units of the second color have a minimum arrangement period of G2; and the driving method further comprises: using a least common multiple of G1 and G2 as G.

For example, in the driving method provided by an embodiment of the present disclosure, G=4, H=16, and the driving method further comprises: driving the plurality of subpixel units connected with the same data line sequentially according to a sequence of following order numbers: 1, 5, 9, 13, 3, 7, 11, 15, 2, 6, 10, 14, 4, 8, 12 and 16.

At least one embodiment of the present disclosure further provides a driving method of any one of the display panels provided by the embodiments of the present disclosure. The subpixel unit array is divided into at least one subpixel-unit scanning group in a one-to-one correspondence with the at least one shift-register-unit scanning group. Each of the at least one subpixel-unit scanning group comprises 8 adjacent rows of subpixel units. For each shift-register-unit scanning group and the corresponding subpixel-unit scanning group, the driving method includes: enabling the shift-register-unit scanning group to supply the scanning signal to the subpixel-unit scanning group correspondingly connected with the shift-register-unit scanning group to cause the subpixel-unit scanning group to be scanned and display in an order of: a 1st row, a 3rd row, a 5th row, a 7th row, a 2nd row, a 4th row, a 6th row, an 8th row, the 1st row, the 3rd row, the 5th row, the 7th row, the 2nd row, the 4th row, the 6th row and the 8th row.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms “first,” “second,” etc., which are used in the description and the claims of the present application for invention, are not intended to indicate any sequence, amount or importance, but distinguish various components. Also, the terms such as “a,” “an,” etc., are not intended to limit the amount, but indicate the existence of at least one. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect”, “connected”, etc., are not intended to define a physical connection or mechanical connection, but may include an electrical connection, directly or indirectly. “On,” “under,” “right,” “left” and the like are only used to indicate relative position relationship, and when the position of the object which is described is changed, the relative position relationship may be changed accordingly.

Figure 1:
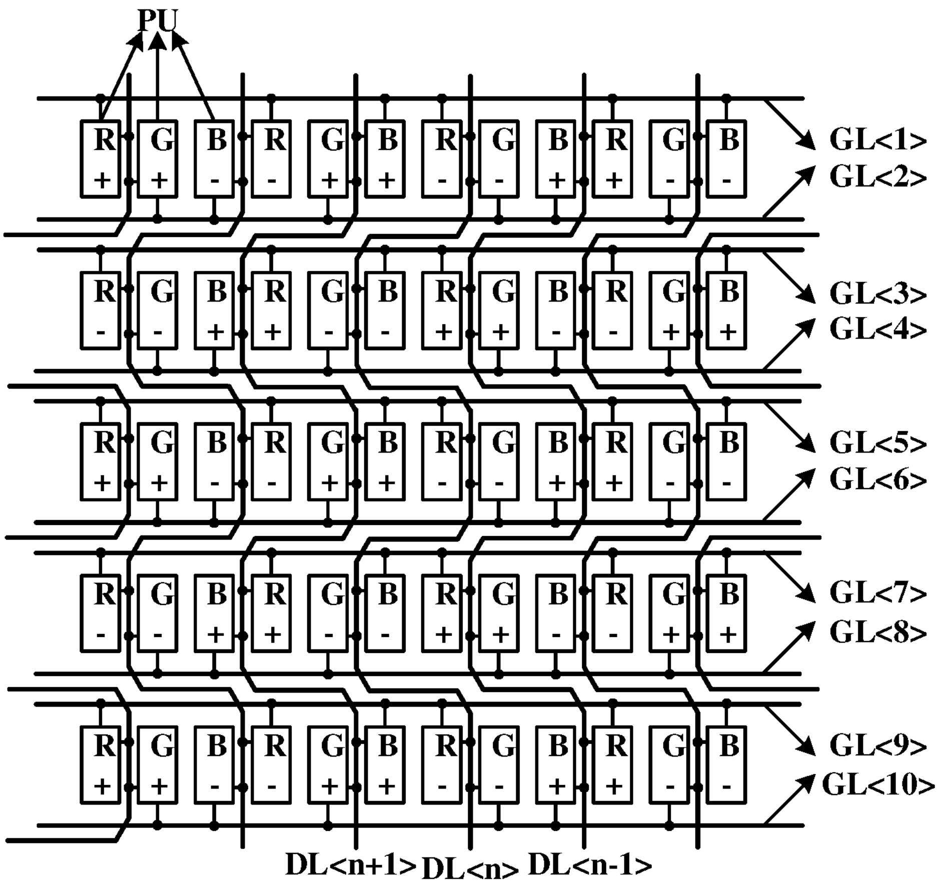
FIG. 1 is a schematic diagram of a display panel.

FIG. 1 shows a display panel including a plurality of subpixel units PU arranged in an array, for example, subpixel units PU of three colors (red subpixel units R, green subpixel units G and blue subpixel units B), so as to implement a colorful display. It should be noted that only 5 rows and 12 columns of subpixel units PU are shown in FIG. 1, and the embodiments of the present disclosure includes but are not limited to this scenario, and the number of the subpixel units PU may be set according to actual situations. In addition, the color type of the subpixel unit PU is not limited. The display panel according to the embodiments of the present disclosure is explained by taking the display panel including RGB subpixel units PU as an example. For example, the display panel is configured as a liquid crystal display (LCD) panel.

As shown in FIG. 1, the display panel is configured as a dual-gate drive display panel. That is, a row of subpixel units is connected with two gate lines correspondingly, and for example, two adjacent subpixel units in the row are connected to different gate lines respectively. For example, the first row of subpixel units PU is connected with the gate lines GL<1>, GL<2>, the second row of subpixel units PU is connected with the gate lines GL<3>, GL<4>, the third row of subpixel units PU is connected with the gate lines GL<5>, GL<6>, the fourth row of subpixel units PU is connected with the gate lines GL<7>, GL<8>, and the fifth row of subpixel units PU is connected with the gate lines GL<9>, GL<10>.

As shown in FIG. 1, the display panel further includes a plurality of data lines DL (for example, DL<n−1>, DL<n>, DL<n+1>, or the like) for transmitting data signals. For example, in the dual-gate drive display panel, the two subpixel units adjacent to each other in a row and connected to different gate lines are connected to the same data line. The plurality of data lines DL have zigzag shapes, and the plurality of subpixel units PU connected with any one data line DL receive the data signals having the same polarity. For example, in the display panel, a data drive circuit may be adopted to provide the data signal to the subpixel unit PU through the data line DL.

In addition, as shown in FIG. 1, a 2-point polarity switching data drive mode is adopted in the dual-gate drive display panel. That is, in the same row of subpixel units PU, every two adjacent subpixel units PU receive the data signals with the same polarity, and in the same column of subpixel units PU, every two adjacent subpixel units PU receive the data signals with different polarities.

Figure 2A:
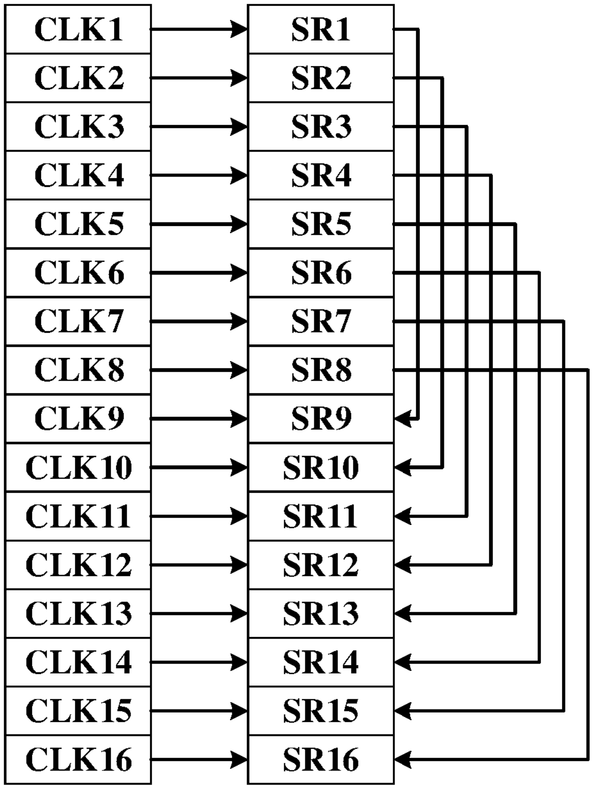
FIG. 2A is a schematic diagram of a relationship between a clock signal and a shift register unit for the display panel shown in FIG. 1.

For example, the display panel in FIG. 1 may be driven by a gate drive circuit, and FIG. 2A shows a part of shift register units (first shift register unit SR1 to sixteenth shift register unit SR 16) included in the gate drive circuit and clock signals (first clock signal CLK1 to sixteenth clock signal CLK16) for the gate drive circuit, and these clock signals are provided by a timing controller (not shown) through corresponding clock signal lines, for example. For example, as shown in FIG. 2A, the first shift register unit SR1 receives the first clock signal CLK1, the second shift register unit SR2 receives the second clock signal CLK2, and so on, and the sixteenth shift register unit SR16 receives the sixteenth clock signal CLK16. In addition, the ninth shift register unit SR9 is cascaded with the first shift register unit SR1, the tenth shift register unit SR10 is cascaded with the second shift register unit SR2, and so on, and the sixteenth shift register unit SR16 is cascaded with the eighth shift register unit SR8.

It should be noted that in the embodiments of the present disclosure, the cascading of the shift register units A, B indicates that an output signal of the shift register unit A is supplied to the shift register B as an input signal to trigger the shift register unit B, or an output signal of the shift register unit B is supplied to the shift register unit A as an input signal to trigger the shift register unit A. The same is applicable to the following embodiments and repeated explanations are not omitted.

Figure 2B:
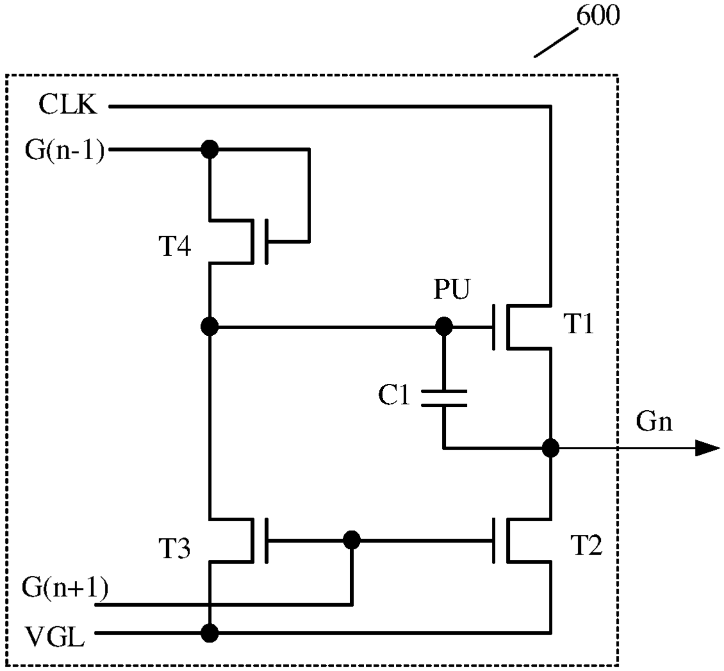
FIG. 2B is an exemplary circuit diagram of a shift register unit.

FIG. 2B is a circuit diagram of an exemplary shift register unit 600 serving as the nth stage of a gate drive circuit, for example. As shown in FIG. 2B, the shift register unit 600 includes a first transistor T1, a second transistor T2, a third transistor T3, a fourth transistor T4 and a storage capacitor C1.

The first transistor T1 in the shift register unit 600 serves as an output transistor of a signal output end of the shift register unit 600. For example, a first electrode of the first transistor T1 is connected with the clock signal CLK, a second electrode of the first transistor T1 is connected with a first electrode of the second transistor T2, so as to obtain an output end of the shift register unit 600 and output a scanning signal Gn and an input signal for the next-stage shift register unit 600. A gate electrode of the first transistor T1 is connected with a pull-up node PU and thus connected with a first electrode of the third transistor T3 and a second electrode of the fourth transistor T4.

A second electrode of the second transistor T2 is connected with a second electrode of the third transistor T3 and a low level signal VGL. A gate electrode of the second transistor T2 is connected with a gate electrode of the third transistor T3 and an output end of the shift register unit 600 of the next row, i.e., the (n+1)th row, so as to receive the scanning signal G(n+1) as an output pull-down control signal. The first electrode of the second transistor T2 is connected with the second electrode of the first transistor T1, and may thus be turned on under the control of the output pull-down control signal, and the output signal of the output end is pulled down to the low level signal VGL without outputting the scanning signal Gn.

The first electrode of the third transistor T3 is also connected with the pull-up node PU and thus electrically connected with the second electrode of the fourth transistor T4 and the gate electrode of the first transistor T1. The second electrode of the third transistor T3 is connected to the low level signal VGL. The gate electrode of the third transistor T3 is also connected with the output end of the shift register unit 600 in the next row, i.e., the (n+1)th row, so as to receive the scanning signal G(n+1) as a reset control signal (which also serves as the output pull-down control signal), so that the third transistor T3 may be turned on under the control of the reset control signal to reset the pull-up node PU to the low level signal VGL, thereby turning off the first transistor T1.

A first electrode of the fourth transistor T4 is connected with a gate electrode of the fourth transistor T4 and the output end of the shift register unit 600 of the previous row, i.e., the (n−1)th row, so as to receive the scanning signal G(n−1) as the input signal (and also as an input control signal), and the second electrode of the fourth transistor T4 is connected with the pull-up node PU, so that the pull-up node PU may be charged when the fourth transistor T4 is turned on, so as to turn on the first transistor T1 by a voltage of the pull-up node PU, thereby outputting the clock signal CLK through the output end. The storage capacitor C1 has an end connected with the gate electrode of the first transistor T1, i.e., the pull-up node PU, and the other end connected with the second electrode of the first transistor T1, thereby storing a level of the pull-up node PU, and continuously pulling up, when the first transistor T1 is turned on for output signals, the level of the pull-up node PU due to a bootstrap effect of the first transistor T1 to improve an output performance.

In the case where the gate drive circuit formed by cascading the shift register units 600 shown in FIG. 2B works, when the scanning signal G(n−1) is at a high level, the fourth transistor T4 is turned on and charges the pull-up node PU, and the first transistor T1 is turned on due to the increased level of the pull-up node PU, so that the clock signal CLK may be output by the output end through the first transistor T1. That is, the scanning signal Gn is equal to the clock signal CLK. When the clock signal CLK is at a high level, the scanning signal Gn also outputs the high level. When the scanning signal Gn is at the high level, the high level signal Gn is inputted into gate line GL of the corresponding row by the shift register unit 600 of the gate drive circuit, so that the signal is applied to the gate electrodes of the thin film transistors in all the subpixel units corresponding to the gate line GL of the row to turn on all the thin film transistors, and the data signal is input to a liquid crystal capacitor of the corresponding subpixel unit through the thin film transistor in each subpixel unit, so as to charge the liquid crystal capacitor in the corresponding subpixel unit, thereby writing a signal voltage to the subpixel unit and maintaining the signal voltage. When the scanning signal G(n+1) is at the high level, the second and third transistors T2, T3 are turned on to reset the pull-up node PU and pull down the output end. Therefore, a progressive scan driving function may be achieved by the gate drive circuit, for example.

It should be noted that in the embodiments of the present disclosure, the shift register unit of the gate drive circuit has a structure not limited to the above-described structure, may have any applicable structure, and may also include more or fewer transistors and/or capacitors. For example, subcircuits for achieving functions of pull-up node control, pull-down node control, noise reduction, or the like are added, which is not limited in the embodiments of the present disclosure.

Figure 3:
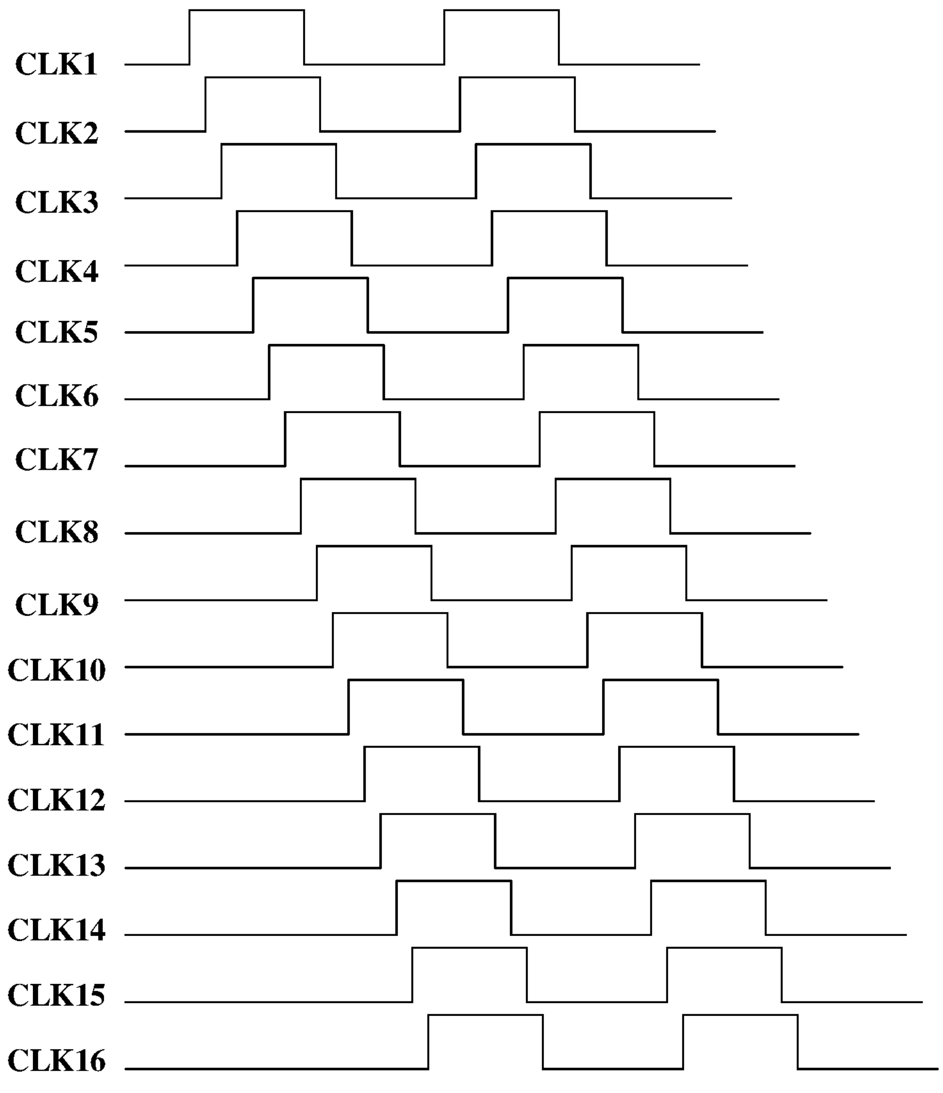
FIG. 3 is a signal timing diagram of the clock signal for the display panel shown in FIG. 1.

FIG. 3 shows a timing relationship of the clock signals (the first clock signal CLK1 to the sixteenth clock signal CLK16) in FIG. 2A. As shown in FIG. 3, the first to sixteenth clock signals CLK1-CLK16 have equal duty ratios (i.e., ratios of duration of the high level to periods) and equal periods. The time when the sixteen clock signals are at the high level covers an entire time range, and thus, the sixteen sub-clock signals may just form a cyclic group.

In addition, as shown in FIG. 3, the time length by any two adjacent clock signals are staggered in timing may be defined as a time unit TU, and thus, the period of the clock signal is 16×TU. Based on the definition of the time unit TU, two clock signals being adjacent in timing indicates that the two clock signals are staggered by one time unit TU in timing. The following embodiments have the same description on the time unit TU and the timing adjacency as the above description, and are not repeated.

For example, the display panel is required to be detected after the manufacturing process is completed. For example, the whole display panel is made to display the same color, for example, red, green, blue, or the like.

For example, as shown in FIG. 1, the order for the subpixel units PU connected with the data line DL<n−1> is R→B→R→G→R→B→R→G→R→B→R→G→R→B→R→G. Assuming that all the red subpixel units R are required to be turned on, the data signal required to be provided by the data line DL<n−1> has a polarity order of +−+−+−+−+−+−+−+−(the red subpixel unit R required to be turned on corresponds to the polarity +, and the subpixel unit of other colors corresponds to the polarity −), and the polarity of the provided data signal is reversed 16 times (a change of the polarity from + to − or from − to + is called a polarity reversal); as another example, the order for the subpixel units PU connected with the data line DL<n> is R→G→B→G→R→G→B→G→R→G→B→G→R→G→B→G. Assuming that all the red subpixel units R are required to be turned on, the data signal required to be provided by the data line DL<n> has a polarity order of +−−−+−−−+−−−+−−− (the red subpixel unit R required to be turned on corresponds to the polarity +, and the subpixel unit of other colors corresponds to the polarity −), and the polarity of the provided data signal is reversed 8 times; as another example, the order for the subpixel units PU connected with the data line DL<n+1> is B→G→R→B→B→G→R→B→B→G→R→B→B→G→R→B. Assuming that all the red subpixel units R are required to be turned on, the data signal required to be provided by the data line DL<n+1> has a polarity order of −−+−−−+−−−+−−−+− (the red subpixel unit R required to be turned on corresponds to the polarity +, and the subpixel unit of other colors corresponds to the polarity −), and the polarity of the provided data signal is reversed 8 times.

As such, when red is displayed at the display panel shown in FIG. 1, the required number of switching is more when the data drive circuit provides the data signal, which increases power consumption of the display panel.

In order to reduce the above-mentioned number of the polarity reversals when the data signal is provided by the data drive circuit, the inventor conceives that the subpixel units of the same color connected with the same data line DL may display successively in timing, so that the above-mentioned number of the polarity reversals may be reduced, thereby reducing the power consumption of the display panel.

As such, every four adjacent subpixel units PU connected with the same data line DL are arranged as a group. For example, the subpixel units PU connected with the data line DL<n−1> may be turned on in an order of R→R→R→R→R→R→R→R→B→B→B→B→G→G→G→G, and in this case, the polarity is reversed 2 times when the data signal is provided by the data drive circuit. As another example, the subpixel units PU connected with the data line DL<n> may be turned on in an order of B→B→B→B→R→R→R→R→G→G→G→G→B→B→B→B, and in this case, the polarity is reversed 3 times when the data signal is provided by the data drive circuit. As another example, the subpixel units PU connected with the data line DL<n+1> may be turned on in an order of R→R→R→R→B→B→B→B→G→G→G→G→G→G→G→G, and in this case, the polarity is reversed 2 times when the data signal is provided by the data drive circuit. Therefore, the number of the polarity reversals may be reduced greatly, thereby reducing the power consumption of the display panel.

Figure 4:
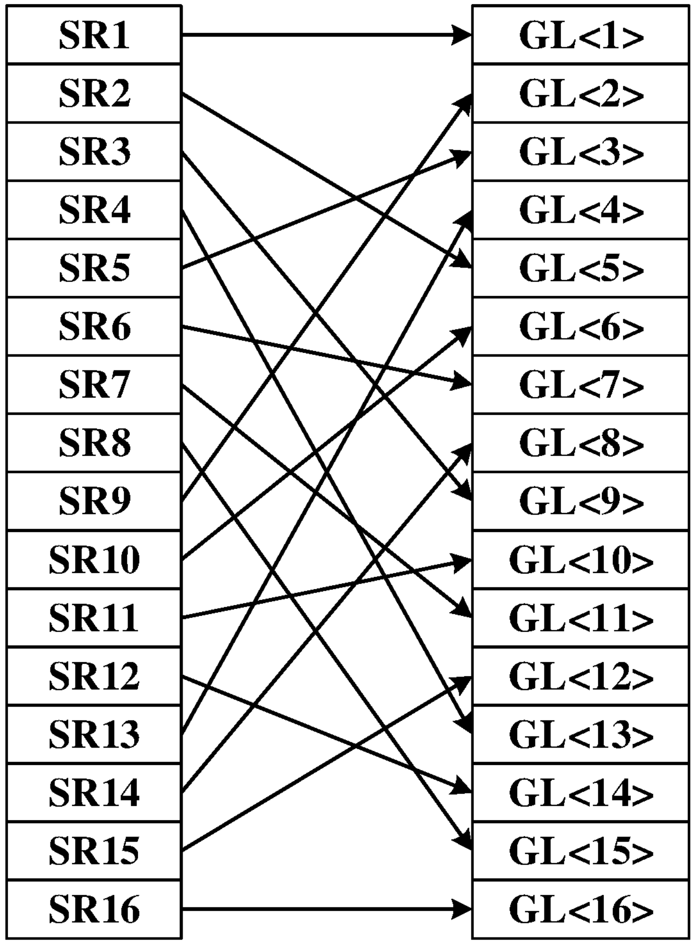
FIG. 4 is a schematic diagram for explaining principles of an embodiment of the present disclosure.

In order to turn on the subpixel units PU of the display panel shown in FIG. 1 in the above-mentioned order, as shown in FIG. 4, the shift register units (SR) and the gate lines (GL) adopt a staggered connection relationship, which increases a design difficulty, thereby causing problems of a poor quality, a low product yield, or the like.

At least one embodiment of the present disclosure provides a display panel including a display region and a peripheral region. The display region includes a subpixel unit array having a plurality of rows and a plurality of columns of subpixel units, a gate drive circuit is provided in the peripheral region, the display region further includes a plurality of gate lines and a plurality of data lines for driving the subpixel unit array, each subpixel unit is driven to work by a scanning signal provided by one gate line and a data signal provided by one data line, and the same data line is connected with at least two subpixel units which are not adjacent to each other and have the same color; the gate drive circuit includes a plurality of shift register units which are arranged sequentially, and the plurality of gate lines are arranged sequentially and electrically connected in one-to-one correspondence with the plurality of shift register units which are arranged sequentially; the gate drive circuit is configured to receive a clock signal and generate the scanning signal, so as to enable the at least two subpixel units of the same color which are connected with the same data line and not adjacent to each other to display successively in timing.

At least one embodiment of the present disclosure further provides a display device and a driving method which correspond to the above-mentioned display panel.

With the display panel, the display device and the driving method according to some embodiments of the present disclosure, the problems of the poor quality and the low product yield caused by staggered wiring of the gate drive circuit and the gate line in the past may be avoided, and meanwhile, the power consumption may be reduced.

The embodiments of the present disclosure and examples thereof are described in detail below in conjunction with the accompanying drawings.

Figure 5:
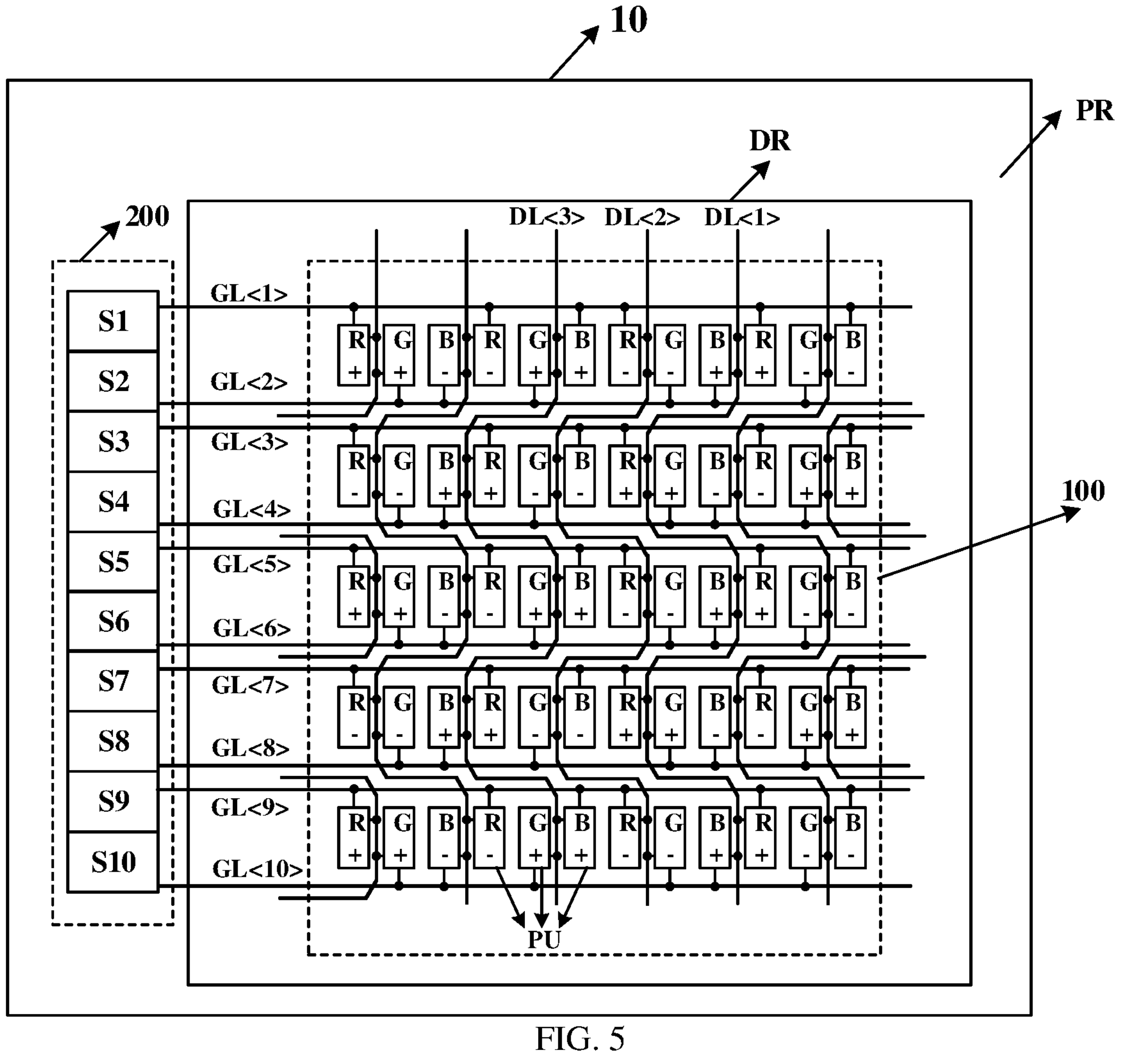
FIG. 5 is a schematic diagram of a display panel according to at least one embodiment of the present disclosure.

At least one embodiment of the present disclosure provides a display panel 10 including a display region DR and a peripheral region PR, as shown in FIG. 5.

The display region DR includes a subpixel unit array 100 having a plurality of rows and a plurality of columns of subpixel units PU. It should be noted that only 5 rows and 12 columns of subpixel units PU are shown in FIG. 5 schematically, the embodiments of the present disclosure include but are not limited to this scenario, and the number of the subpixel units PU included by the display panel 10 may be set as required. For example, the subpixel unit array 100 shown in FIG. 5 may be arranged as in FIG. 1.

A gate drive circuit 200 is provided in the peripheral region PR, the display region DR further includes a plurality of gate lines GL (for example, GL<1>, GL<2>, or the like) and a plurality of data lines DL (for example, DL<1>, DL<2>, DL<3>, or the like) for driving the subpixel unit array 100, each subpixel unit PU is driven to display by a scanning signal provided by one gate line GL and a data signal provided by one data line DL, and the same data line DL is connected with at least two subpixel units PU which are not adjacent to each other and have the same color. For example, the subpixel units PU connected with the data line DL<1> has an order (which is from top to bottom and from right to left in the drawing, and the same applies below) of R→B→R→G→R→B→R→G→R→B→R→G→R→B→R→G, the subpixel units PU connected with the data line DL<2> has an order of R→G→B→G→R→G→B→G→R→G→B→G→R→G→B→G, and the subpixel units PU connected with the data line DL<3> has an order of B→G→R→B→B→G→R→B→B→G→R→B→B→G→R→B.

It should be noted that in the embodiment shown in FIG. 5, the subpixel units PU of the same color are not adjacent among the plurality of subpixel units PU connected with each data line DL, and the embodiments of the present disclosure include but are not limited this scenario. For example, it is also possible that only the subpixel units PU of one color are not adjacent, and the subpixel units PU of the other two colors are adjacent; as another example, it is also possible that only the subpixel units PU of two colors are not adjacent, and the subpixel units PU of another color are adjacent.

The gate drive circuit 200 includes a plurality of shift register units S1 to S10 arranged in sequence, and the plurality of gate lines GL are arranged in sequence and electrically connected with the plurality of shift register units (S1 to S10, or the like) arranged in sequence in a one-to-one correspondence in order. As shown in FIG. 5, staggered wiring is avoided when the plurality of shift register units in the gate drive circuit 200 of the display panel 10 are connected with the plurality of gate lines GL, thereby avoiding the problems of the poor quality and the low product yield caused by the staggered wiring of the gate drive circuit 200 and the gate line GL in the past. It should be noted that only 10 shift register units in the gate drive circuit 200 are shown in FIG. 5 schematically, the embodiments of the present disclosure include but are not limited to this scenario, and the number of the shift register units included in the gate drive circuit 200 may be set as required. For example, in a dual-gate drive display panel, the number of the shift register units may be set to be twice the number of the rows of the subpixel units PU.

For example, the gate drive circuit 200 is configured to receive a clock signal and generate the scanning signal, so as to enable at least two subpixel units PU of the same color which are connected with the same data line DL and not adjacent to each other to display successively in timing. For example, under the driving effect of the scanning signal provided by the gate drive circuit 200, the subpixel units PU connected with the data line DL<1> may have a display order of R→R→R→R→R→R→R→R→B→B→B→B→G→G→G→G, the subpixel units PU connected with the data line DL<2> may have a display order of B→B→B→B→R→R→R→R→G→G→G→G→B→B→B→B, and the subpixel units PU connected with the data line DL<2> may have a display order of R→R→R→R→B→B→B→B→G→G→G→G→G→G→G→G. That is, under the driving effect of the scanning signal provided by the gate drive circuit 200, the subpixel units PU of the same color display successively in timing among the plurality of subpixel units PU connected with any one data line DL.

In the display panel 10 according to the embodiments of the present disclosure, the subpixel unit array 100 in the display region DR is driven by the gate drive circuit 200, so as to enable the at least two subpixel units PU of the same color which are connected with the same data line DL and not adjacent to each other to display successively in timing, for example, enable all the subpixel units PU of the same color which are connected with the same data line DL and not adjacent to each other to display successively in timing. In this way, the number of the polarity reversals of the data signal supplied to the subpixel unit array 100 may be reduced, thereby reducing the power consumption of the display panel 10. For example, the data signal may be supplied to the subpixel unit array 100 by a data drive circuit.

For example, in some embodiments of the present disclosure, the plurality of subpixel units PU connected with the same data line DL sequentially are divided into G driving groups when driven, the number of the clock signals is H, each driving group includes F subpixel units, F=[H/G], and [H/G] denotes rounding H/G. The gate drive circuit 200 is further configured to enable the F subpixel units PU in a Bth driving group to be driven in an order of $A_d$=B+(d−1)×G, $A_d$ denotes an order number of the subpixel unit PU driven for the dth time, B is a positive integer less than or equal to G, and d is a positive integer less than or equal to F.

For example, the plurality of subpixel units PU connected with the same data line DL sequentially at least have a first color and a second color, and among the plurality of subpixel units PU connected with the same data line DL sequentially, the subpixel units PU of the first color have a minimum arrangement period of G1, the subpixel units PU of the second color have a minimum arrangement period of G2, and then G is a least common multiple of G1 and G2.

For example, as shown in FIG. 5, the following description will be given by taking the subpixel unit PU connected with the data line DL<1> as an example. The subpixel units PU connected with the data line DL<1> have an order of R→B→R→G→R→B→R→G→R→B→R→G→R-→B→R→G; for example, the first color is red, and the second color is green, so that the subpixel units PU of the first color have the minimum arrangement period of 2, i.e., G1=2, the subpixel units PU of the second color have the minimum arrangement period of 4, i.e., G2=4, and then G1 and G2 have the least common multiple of 4, i.e., G=4. It should be noted that since the blue subpixel units PU also have an arrangement period of 4, the description is made here by taking the two colors as an example, but when the arrangement periods of the three colors are different from each other, the value of G is the least common multiple of the arrangement periods of the subpixel units PU of the three colors.

For example, in some embodiments, 16 clock signals are received by the gate drive circuit, i.e., H=16, so that each driving group includes F=[H/G]=4 subpixel units. Then, in the 1st driving group (B=1), the subpixel unit PU driven for the 1st time (d=1) has an order number of $A_1$=1+(1−1)×4=1, the subpixel unit PU driven for the 2nd time (d=2) has an order number of $A_2$=1+(2−1)*4=5, the subpixel unit PU driven for the 3rd time (d=3) has an order number of $A_3$=1+(3−1)*4=9, and the subpixel unit PU driven for the 4th time (d=4) has an order number of $A_4$=1+(4−1)*4=13; similarly, in the 2nd driving group, the subpixel units PU which are driven sequentially have order numbers of 2, 6, 10 and 14; in the 3rd driving group, the subpixel units PU which are driven sequentially have order numbers of 3, 7, 11 and 15; in the 4th driving group, the subpixel units PU which are driven sequentially have order numbers of 4, 8, 12 and 16.

It should be noted that the order of the above-mentioned driving groups is not limited in the embodiments of the present disclosure. For example, in some embodiments, the gate drive circuit 200 is configured to enable the driving groups to be driven in an order of the 1st driving group, the 3rd driving group, the 2nd driving group and the 4th driving group. That is, the 16 subpixel units PU connected with the same data line are driven in an order of 1, 5, 9, 13, 3, 7, 11, 15, 2, 6, 10, 14, 4, 8, 12 and 16. The gate drive circuit 200 shown in FIG. 5 is further described below.

Figure 6:
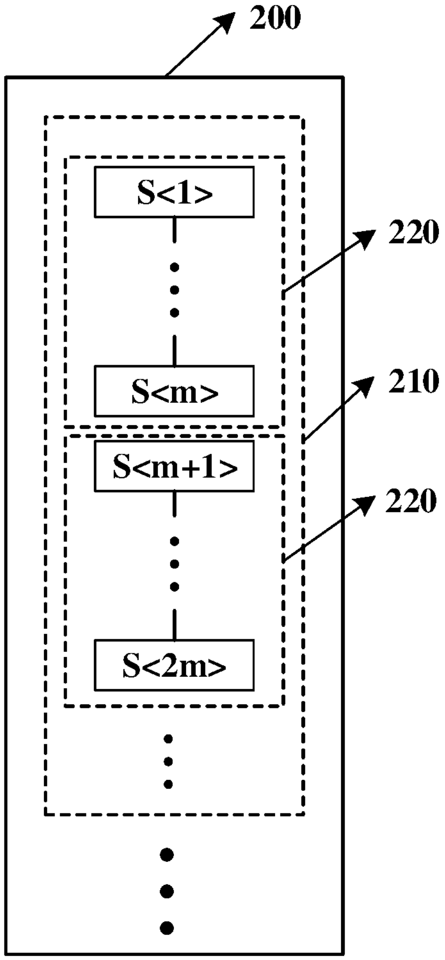
FIG. 6 is a schematic diagram of a gate drive circuit according to at least one embodiment of the present disclosure.

For example, as shown in FIG. 6, the plurality of shift register units PU are divided into at least one shift-register-unit scanning group 210, each of which includes a plurality of shift register unit groups 220 formed by adjacent and cascaded shift register units PU, and every two adjacent shift register unit groups 220 are not cascaded. For example, as shown in FIG. 6, each shift register unit group 220 includes m adjacent and cascaded shift register units PU, and m is an integer greater than or equal to 2.

It should be noted that, for clarity of illustration, only one shift-register-unit scanning group 210 included in the gate drive circuit 200 is schematically shown in FIG. 6, the embodiments of the present disclosure include but are not limited to this scenario, and the number of the shift-register-unit scanning groups 210 included in the gate drive circuit 200 may be set as required in the embodiments of the present disclosure.

Figure 7:
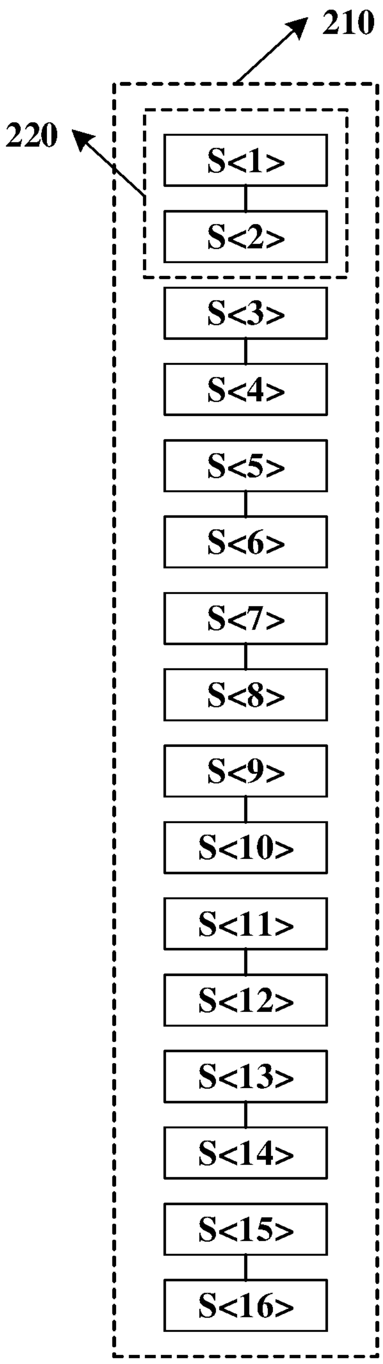
FIG. 7 is a schematic diagram of a shift-register-unit scanning group according to at least one embodiment of the present disclosure.

In some embodiments of the present disclosure, for example, as shown in FIG. 7, each shift-register-unit scanning group 210 includes 16 shift register units (S<1> to S<16>), and in each shift-register-unit scanning group 210, the (k+1)th and (k)th shift register units are cascaded to form one shift register unit group 220, the (k+1)th and (k+2)th shift register units are not cascaded, and k is 1, 3, 5, 7, 9, 11, 13 or 15.

For example, as shown in FIG. 7, the 2nd and 1st shift register units S<2>, S<1> are cascaded to form one shift register unit group 220, and the 2nd and 3rd shift register units S<2>, S<3> are not cascaded; the 4th and 3rd shift register units S<4>, S<3> are cascaded to form one shift register unit group 220, and the 4th and 5th shift register units S<4>, S<5> are not cascaded; the 6th and 5th shift register units S<6>, S<5> are cascaded to form one shift register unit group 220, and the 6th and 7th shift register units S<6>, S<7> are not cascaded; the 8th and 7th shift register units S<8>, S<7> are cascaded to form one shift register unit group 220, and the 8th and 9th shift register units S<8>, S<9> are not cascaded; the 10th and 9th shift register units S<10>, S<9> are cascaded to form one shift register unit group 220, and the 10th and 11th shift register units S<10>, S<11> are not cascaded; the 12th and 11th shift register units S<12>, S<11> are cascaded to form one shift register unit group 220, and the 12th and 13th shift register units S<12>, S<13> are not cascaded; the 14th and 13th shift register units S<14>, S<13> are cascaded to form one shift register unit group 220, and the 14th and 15th shift register units S<14>, S<15> are not cascaded; the 16th and 15th shift register units S<16>, S<15> are cascaded to form one shift register unit group 220.

The case where the gate drive circuit 200 includes a plurality of cascaded shift-register-unit scanning groups 210 is described below in conjunction with FIG. 8.

Figure 8:
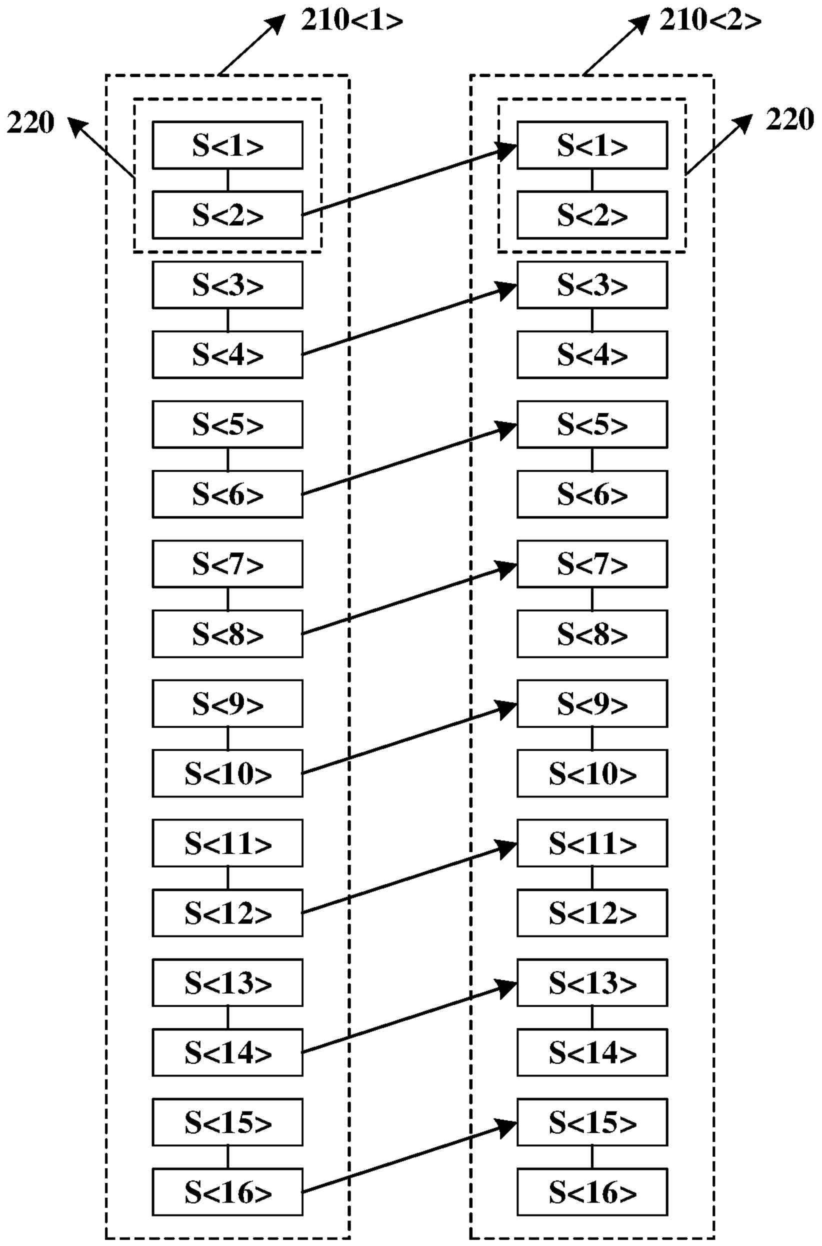
FIG. 8 is a schematic diagram of a connection relationship among a plurality of shift-register-unit scanning groups according to at least one embodiment of the present disclosure.

In some embodiments of the present disclosure, for example, as shown in FIG. 8, the gate drive circuit 200 includes a plurality of shift-register-unit scanning groups 210. It should be noted that, for clarity of illustration, FIG. 8 only shows two shift-register-unit scanning groups 210 included in the gate drive circuit 200, which are denoted as 210<1> and 210<2> respectively, for example. The kth shift register unit in a shift-register-unit scanning group 210<2> of the two adjacent shift-register-unit scanning groups 210 is connected with the (k+1)th shift register unit in the other shift-register-unit scanning group 210<1> of the two adjacent shift-register-unit scanning groups 210, and k is 1, 3, 5, 7, 9, 11, 13 or 15. In addition, it should be noted that a relative positional relationship between the two shift-register-unit scanning groups 210 shown in FIG. 8 does not represent a true positional relationship, and for convenience of description here, the shift-register-unit scanning group 210<2> is drawn at the right side of the shift-register-unit scanning group 210<1>.

For example, as shown in FIG. 8, the 1st shift register unit S<1> in the shift-register-unit scanning group 210<2> is connected with the 2nd shift register unit S<2> in the shift-register-unit scanning group 210<1>; the 3rd shift register unit S<3> in the shift-register-unit scanning group 210<2> is connected with the 4th shift register unit S<4> in the shift-register-unit scanning group 210<1>; the 5th shift register unit S<5> in the shift-register-unit scanning group 210<2> is connected with the 6th shift register unit S<6> in the shift-register-unit scanning group 210<1>; the 7th shift register unit S<7> in the shift-register-unit scanning group 210<2> is connected with the 8th shift register unit S<8> in the shift-register-unit scanning group 210<1>; the 9th shift register unit S<9> in the shift-register-unit scanning group 210<2> is connected with the 10th shift register unit S<10> in the shift-register-unit scanning group 210<1>; the 11th shift register unit S<11> in the shift-register-unit scanning group 210<2> is connected with the 12th shift register unit S<12> in the shift-register-unit scanning group 210<1>; the 13th shift register unit S<13> in the shift-register-unit scanning group 210<2> is connected with the 2th shift register unit S<14> in the shift-register-unit scanning group 210<14>; the 15th shift register unit S<15> in the shift-register-unit scanning group 210<2> is connected with the 16th shift register unit S<16> in the shift-register-unit scanning group 210<1>.

Figure 9:
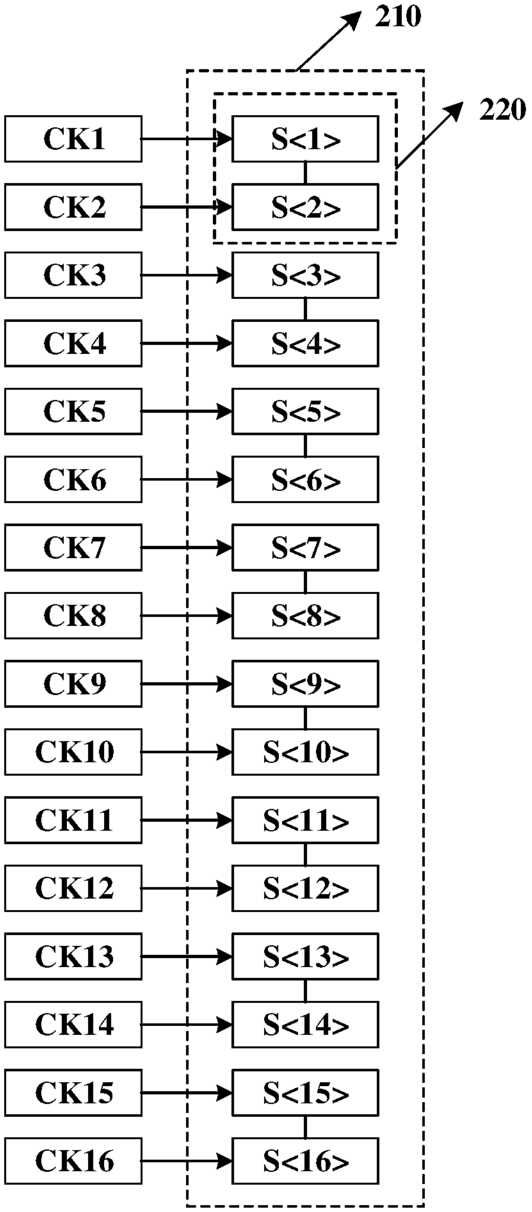
FIG. 9 is a schematic diagram of a relationship between a clock signal and a shift register unit for the display panel shown in FIG. 5.

In the display panel 10 according to some embodiments, as shown in FIG. 9, the first clock signal CK1 to the sixteenth clock signal CK16 are received by the 16 shift register units (S<1> to S<16>) in each shift-register-unit scanning group 210 respectively, and have equal periods and equal duty ratios.

Figure 10:
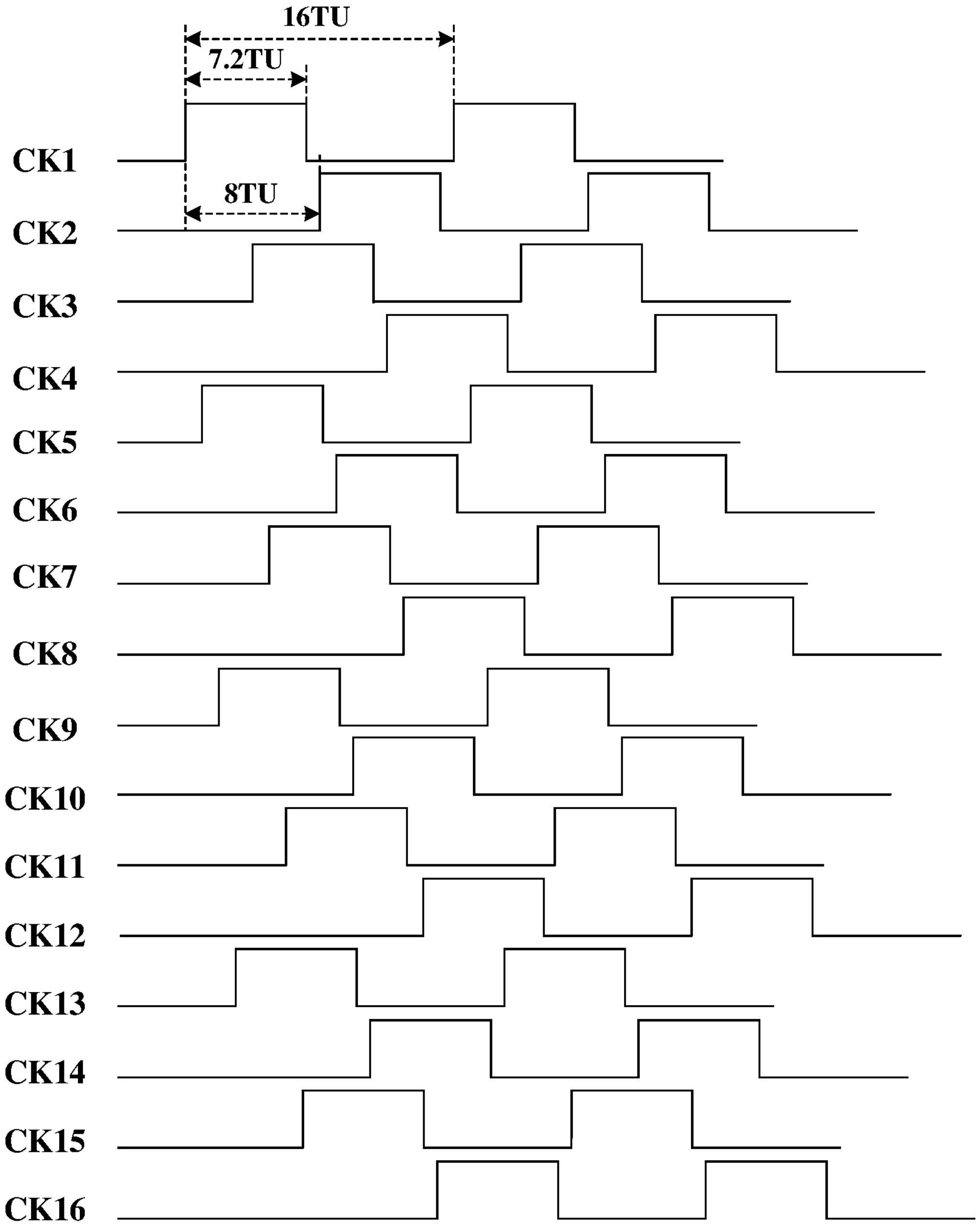
FIG. 10 is a signal timing diagram of a clock signal for the display panel shown in FIG. 5.

For example, FIG. 10 shows a signal timing diagram of the clock signal for the display panel 10 according to the embodiments of the present disclosure. As shown in FIG. 10, the first to sixteenth clock signals CK1 to CK16 are provided by a timing controller, and have equal periods and equal duty ratios. For example, each clock signal has a period of 16 time units TU, i.e., 16TU, and a ratio of the time during which the clock signal is at a high level to the period in each clock signal is 7.2/16. That is, each clock signal has a duty ratio of 9/20. It should be noted that the duty ratio shown in FIG. 10 is merely illustrative, and the clock signal in the embodiments of the present disclosure may also have other duty ratios. For example, the time during which the clock signal is at a low level may be slightly longer than the time during which the clock signal is at the high level.

For example, as shown in FIG. 10, the first, fifth, ninth, thirteenth, third, seventh, eleventh and fifteenth clock signals CK1, CK5, CK9, CK13, CK3, CK7, CK11, CK15 are adjacent to each other in timing.

The second, sixth, tenth, fourteenth, fourth, eighth, twelfth and sixteenth clock signals CK2, CK6, CK10, CK14, CK4, CK8, CK12, CK16 are adjacent to each other in timing. The first and second clock signals CK1, CK2 differ in timing by 8 time units TU.

That is, the first to sixteenth clock signals CK1 to CK16 are supplied to the gate drive circuit 200 in an order of CK1→CK5→CK9→CK13→CK3→CK7→CK11→CK15→CK2→CK6→CK10→CK14→CK 4→CK8→CK12→CK16. For example, the above-mentioned order of the clock signals may be stored in the timing controller or other devices of the display panel 10 in a form of program codes (algorithm), and the program codes may be executed directly to generate the required clock signal when required.

Figure 11:
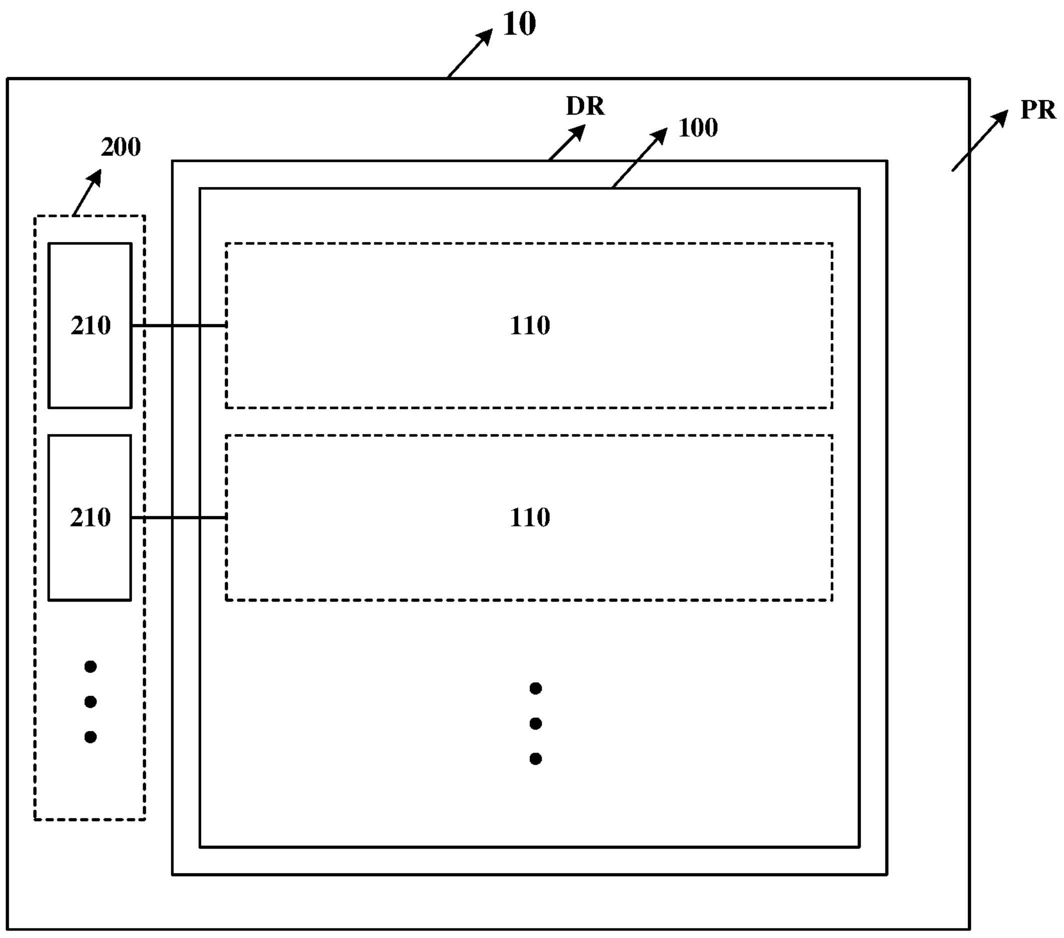
FIG. 11 is a schematic diagram of another display panel according to at least one embodiment of the present disclosure.

In the display panel 10 according to some embodiments, for example, as shown in FIG. 11, the subpixel unit array 100 is divided into at least one subpixel-unit scanning group 110 in one-to-one correspondence to the at least one shift-register-unit scanning group 210. For example, FIG. 11 shows two subpixel-unit scanning groups 110 and two corresponding shift-register-unit scanning groups 210, the embodiments of the present disclosure include but are not limited to this scenario, and the number of the subpixel-unit scanning groups 110 in the embodiments of the present disclosure may be set as required.

Figure 12:
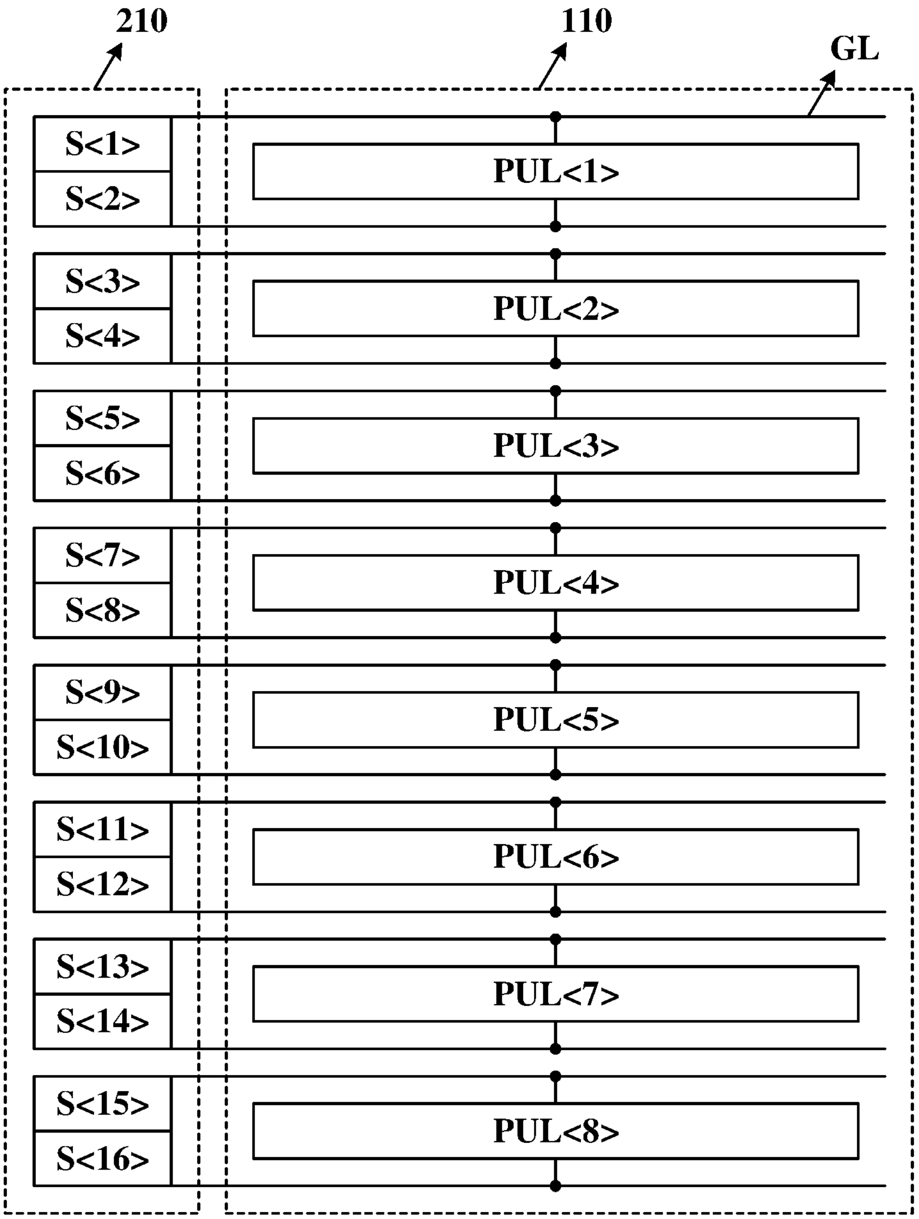
FIG. 12 is a schematic diagram of a connection relationship between a shift-register-unit scanning group and a subpixel-unit scanning group according to at least one embodiment of the present disclosure.

For example, in the display panel 10 according to some embodiments, as shown in FIG. 12, each shift-register-unit scanning group 110 includes 16 shift register units (S<1> to S<16>), and each subpixel-unit scanning group 110 includes 8 rows of subpixel units adjacent to each other, for example, a first row of subpixel units PUL<1> to an eighth row of subpixel units PUL<8>.

For example, the qth row of subpixel units in each subpixel-unit scanning group 110 is electrically connected with the (2q−1)th shift register unit and the 2qth shift register unit in the shift-register-unit scanning group 210 corresponding to the subpixel-unit scanning group 110, and q is an integer greater than or equal to 1 and less than or equal to 8. For example, as shown in FIG. 12, the first row of subpixel units PUL<1> is electrically connected with the first and second shift register units S<1>, S<2>; the second row of subpixel units PUL<2> is electrically connected with the third and fourth shift register units S<3>, S<4>; the third row of subpixel units PUL<3> is electrically connected with the fifth and sixth shift register units S<5>, S<6>; the fourth row of subpixel units PUL<4> is electrically connected with the seventh and eighth shift register units S<7>, S<8>; the fifth row of subpixel units PUL<5> is electrically connected with the ninth and tenth shift register units S<9>, S<10>; the sixth row of subpixel units PUL<6> is electrically connected with the eleventh and twelfth shift register units S<11>, S<12>; the seventh row of subpixel units PUL<7> is electrically connected with the thirteenth and fourteenth shift register units S<13>, S<14>; the eighth row of subpixel units PUL<8> is electrically connected with the fifteenth and sixteenth shift register units S<15>, S<16>.

For example, the shift register unit may be electrically connected with the corresponding row of subpixel units by the gate line. For example, as shown in FIG. 12, one gate line GL is provided at each of two sides of each row of subpixel units, and the row of subpixel units is connected with the two gate lines GL provided at the two sides. For example, FIG. 13 shows a way of connection among the gate line GL, the shift register unit and the corresponding subpixel unit.

Figure 13:
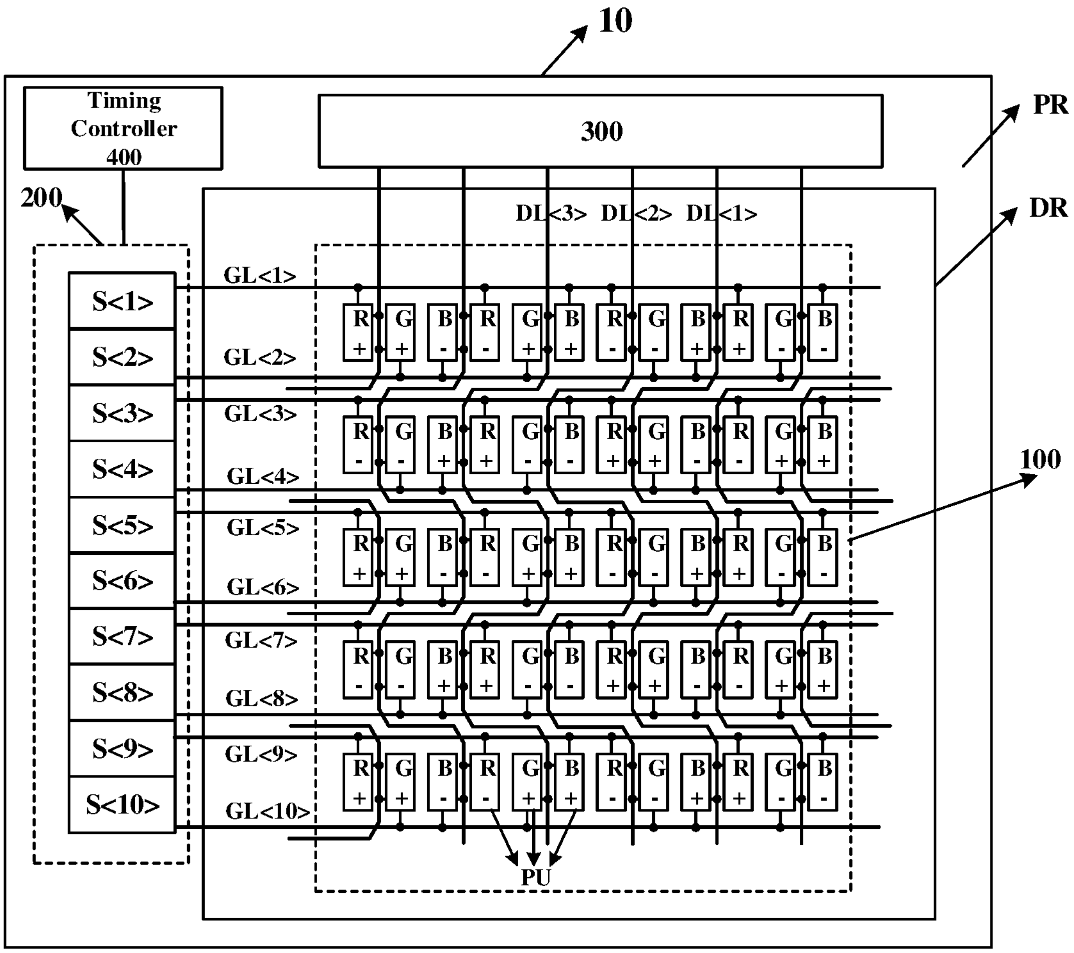
FIG. 13 is a schematic diagram of still another display panel according to at least one embodiment of the present disclosure.

As shown in FIG. 13, the display panel 10 according to some embodiments includes the gate drive circuit 200 provided in the peripheral region PR, and further includes the data drive circuit 300 provided in the peripheral region PR. The gate drive circuit 200 is connected with the plurality of gate lines, and is also connected with the timing controller 400 through a clock signal line to receive the clock signal; the data drive circuit 300 is connected with the plurality of data lines DL, and configured to supply the data signal to the subpixel unit array 100 by means of a 2-point polarity switching manner. The 2-point polarity switching manner may refer to corresponding description in FIG. 1, and is not repeated here.

For example, as shown in FIG. 13, any one of the plurality of data lines DL provides the data signal having the same polarity, and has a zigzag wiring shape.

A working principle of the display panel 10 shown in FIG. 13 will be described below in conjunction with the signal timing diagram shown in FIG. 10. The following description will be given by taking the subpixel unit PU connected with the data line DL<1> as an example.

Since the first clock signal CK1 is the earliest in timing, the first shift register unit S<1> provides a scanning signal through the gate line GL<1>, and meanwhile, the data drive circuit 300 provides a data signal through the data line DL<1>, so that one red subpixel unit R connected with the data line DL<1> is driven by the scanning signal and the data signal to display.

Then, since the fifth clock signal CK5 is adjacent to the first clock signal CK1 in timing, the fifth shift register unit S<5> provides a scanning signal through the gate line GL<5>, and meanwhile, the data drive circuit 300 provides a data signal through the data line DL<1>, so that another red subpixel unit R connected with the data line DL<1> is driven by the scanning signal and the data signal to display.

Then, since the ninth clock signal CK9 is adjacent to the fifth clock signal CK5 in timing, the ninth shift register unit S<9> provides a scanning signal through the gate line GL<9>, and meanwhile, the data drive circuit 300 provides a data signal through the data line DL<1>, so that another red subpixel unit R connected with the data line DL<1> is driven by the scanning signal and the data signal to display.

Then, since the thirteenth clock signal CK13 is adjacent to the ninth clock signal CK9 in timing, the thirteenth shift register unit S<13> provides a scanning signal through the gate line GL<13> (S<13> and the gate line GL<13> are not shown in FIG. 13), and meanwhile, the data drive circuit 300 provides a data signal through the data line DL<1>, so that another red subpixel unit R connected with the data line DL<1> is driven by the scanning signal and the data signal to display.

In a similar fashion, the gate drive circuit 200 supplies the scanning signal to the subpixel unit array 100 according to the timing of the received clock signals, and the data drive circuit 300 supplies the data signal to the turned-on subpixel units PU through the data line DL<1>, so that the subpixel units PU connected with the data line DL<1> displays in an order of R→R→R→R→R→R→R→R→B→B→B→B→G→G→G→G, so as to enable the subpixel units PU of the same color among the plurality of subpixel units PU connected with the data line DL<1> to display successively in timing, thereby decreasing the number of the polarity reversals of the data signal supplied to the subpixel unit array 100, and reducing the power consumption of the display panel 10.

Figure 14:
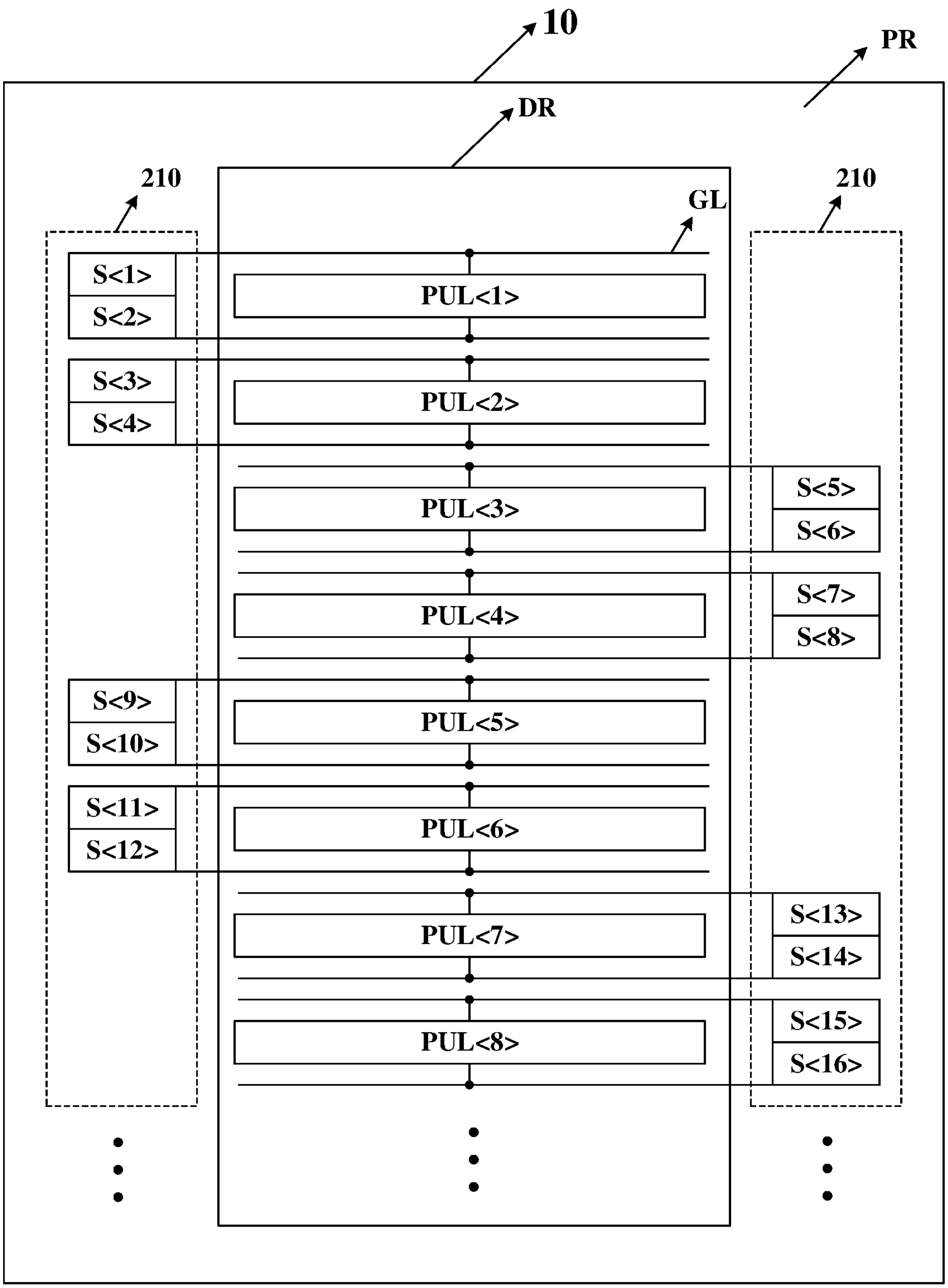
FIG. 14 is a schematic diagram of yet another display panel according to at least one embodiment of the present disclosure.

In the display panel 10 according to some embodiments, as shown in FIG. 14, in each shift-register-unit scanning group 210, the Lth shift register unit is provided at a first side of the display region DR, the Rth shift register unit is provided at a second side of the display region DR opposite to the first side, L is 1, 2, 3, 4, 9, 10, 11 or 12, and R is 5, 6, 7, 8, 13, 14, 15 or 16. For example, the first side is the left side of the display region DR, and the second side is the right side of the display region DR; alternatively, the first side is the right side of the display region DR, and the second side is the left side of the display region DR. That is, the shift register units in the gate drive circuit 200 in the display panel 10 according to the embodiments of the present disclosure may be provided at both sides of the display region DR respectively.

As another example, in the display panel 10 according to some other embodiments, all the shift register units in the gate drive circuit 200 may be provided at one side of the display region DR.

Compared with the case where the shift register units in the gate drive circuit 200 are all provided at one side of the display region DR, by providing the shift register units in the gate drive circuit 200 at both sides of the display region DR respectively, a bezel of the display panel may have a size which is reduced, and a narrow bezel may be implemented more easily.

Figure 15:
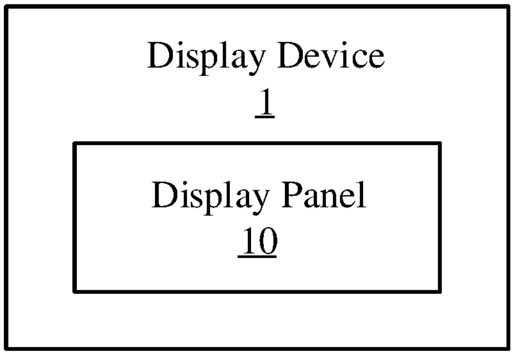
FIG. 15 is a schematic diagram of a display device according to at least one embodiment of the present disclosure.

At least one embodiment of the present disclosure further provides a display device 1 including any one of the display panels 10 according to the embodiments of the present disclosure, as shown in FIG. 15.

It should be noted that the display device 1 according to the embodiment may be configured as any product or component with a displaying function, such as a liquid crystal display panel, a liquid crystal display television, a display, an OLED panel, an OLED television, an electronic paper, a mobile phone, a tablet computer, a notebook computer, a digital photo frame, a navigator, or the like.

Technical effects of the display device 1 according to the embodiment of the present disclosure may refer to corresponding description about the display panel 10 in the above-mentioned embodiments, and are not repeated here.

At least one embodiment of the present disclosure further provides a driving method of a display panel, for example, any one of the display panels 10 according to the embodiments of the present disclosure. The driving method includes: supplying the clock signal to the gate drive circuit 200 to cause the gate drive circuit 200 to generate the scanning signal, so as to enable at least two subpixel units PU of the same color which are connected with the same data line DL and not adjacent to each other to display successively in timing.

In the driving method according to some embodiments of the present disclosure, for example, the plurality of subpixel units PU connected with the same data line DL sequentially are divided into G driving groups when driven, the number of the clock signals is H, each driving group includes F subpixel units, F=[H/G], [H/G] denotes rounding H/G, and the driving method further includes: driving the F subpixel units PU in the Bth driving group in an order of $A_d$=B+(d−1)×G, wherein $A_d$ denotes an order number of the subpixel unit PU driven for the dth time, B is a positive integer less than or equal to G, and d is a positive integer less than or equal to F.

In the driving method according to some embodiments of the present disclosure, for example, the plurality of subpixel units PU connected with the same data line DL sequentially at least have a first color and a second color, and among the plurality of subpixel units PU connected with the same data line DL sequentially, the subpixel units PU of the first color have a minimum arrangement period of G1, the subpixel units PU of the second color have a minimum arrangement period of G2, and the driving method further includes: taking a least common multiple of G1 and G2 as G.

In the driving method according to some embodiments of the present disclosure, for example, G=4, H=16, and the driving method further includes: driving the 16 subpixel units connected with the same data line sequentially according to a sequence of following order numbers: 1, 5, 9, 13, 3, 7, 11, 15, 2, 6, 10, 14, 4, 8, 12 and 16.

At least one embodiment of the present disclosure further provides a driving method of a display panel. For example, a subpixel unit array 100 of the display panel 10 is divided into at least one subpixel-unit scanning group 110 in one-to-one correspondence with at least one shift-register-unit scanning group 210, and each subpixel-unit scanning group 110 includes 8 rows of subpixel units PU adjacent to each other.

For each shift-register-unit scanning group 210 and the corresponding subpixel-unit scanning group 110, the driving method includes the following operation steps:

enabling the shift-register-unit scanning group 210 to supply the scanning signal to the subpixel-unit scanning group 110 correspondingly connected with the shift-register-unit scanning group 210 to cause the subpixel-unit scanning group 110 to be scanned and display in an order of:

a 1st row, a 3rd row, a 5th row, a 7th row, a 2nd row, a 4th row, a 6th row, an 8th row, the 1st row, the 3rd row, the 5th row, the 7th row, the 2nd row, the 4th row, the 6th row and the 8th row.

It should be noted that detailed description and technical effects of the above-mentioned driving method may refer to the above-mentioned corresponding description about the display panel 10.

What are described above is related to the illustrative embodiments of the disclosure only and not limitative to the scope of the disclosure; the scopes of the disclosure are defined by the accompanying claims.

What is claimed is:

1. A display panel, comprising a display region and a peripheral region, wherein the display region comprises a subpixel unit array having a plurality of rows and a plurality of columns of subpixel units, and the peripheral region comprises a gate drive circuit;

the display region further comprises a plurality of gate lines and a plurality of data lines, the gate drive circuit comprises a plurality of shift register units arranged in sequence, and the plurality of gate lines are electrically connected with the plurality of shift register units;

the gate drive circuit comprises two shift-register-unit scanning groups, in the shift-register-unit scanning groups, a (k+1)th shift register unit and a (k)th shift register unit form one shift register unit group, the (k)th shift register unit in one of the shift-register-unit scanning groups and the (k+1)th shift register unit in another of the shift-register-unit scanning groups are connected.

2. The display panel according to claim 1, wherein one gate line is provided at each of two sides of a row of subpixel units, and the row of subpixel units is connected with the two gate lines provided at the two sides.

3. The display panel according to claim 2, wherein the plurality of subpixel units connected with the same data line in sequence have at least a first color and a second color.

4. The display panel according to claim 1, wherein the plurality of shift register unit comprises a first transistor, a second transistor, a third transistor, a fourth transistor, a first electrode of the first transistor is connected with a clock signal, and a second electrode of the first transistor is connected with a first electrode of the second transistor;

a first electrode of the third transistor, a second electrode of the fourth transistor and a gate electrode of the first transistor are connected with a pull-up node;

a first electrode of the fourth transistor is connected with a gate electrode of the fourth transistor.

5. The display panel according to claim 4, wherein the first electrode of the fourth transistor is connected with an output end of the shift register unit of a previous row, to receive a scanning signal as an input signal and an input control signal, and a gate electrode of the second transistor and a gate electrode of the third transistor are connected with an output end of the shift register unit of a next row to receive a scanning signal as an output pull-down control signal.

6. The display panel according to claim 4, wherein the shift register unit further comprises a storage capacitor, the storage capacitor has an end connected with the gate electrode of the first transistor and the pull-up node and another end connected with a second electrode of the first transistor; a gate electrode of the third transistor is connected with a gate electrode of the second transistor; a second electrode of the second transistor is connected with a low level signal.

7. A display panel, comprising a display region and a peripheral region, wherein the display region comprises a subpixel unit array having a plurality of rows and a plurality of columns of subpixel units, and the peripheral region comprises a gate drive circuit;

the display region further comprises a plurality of gate lines and a plurality of data lines for driving the subpixel unit array, each subpixel unit is driven by a scanning signal provided by one gate line of the plurality of gate lines and a data signal provided by one data line of the plurality of data lines to display, and a same data line is connected with at least two subpixel units which are not adjacent to each other and have a same color;

the gate drive circuit comprises a plurality of shift register units arranged in sequence, and the plurality of gate lines are arranged in sequence and electrically connected with the plurality of shift register units arranged in sequence, the plurality of shift register units are divided into at least one shift-register-unit scanning group;

the gate drive circuit is configured to receive clock signals and generate the scanning signal to enable the at least two subpixel units of the same color which are connected with the same data line and not adjacent to each other to display successively in timing, the subpixel unit array is divided into at least one subpixel-unit scanning group, the at least one subpixel-unit scanning group is in a one-to-one correspondence with the at least one shift-register-unit scanning group, a qth row of subpixel units in each of the at least one subpixel-unit scanning group is electrically connected with a (2q−1)th shift register unit and a (2q)th shift register unit in the shift-register-unit scanning group corresponding to the subpixel-unit scanning group, and q is an integer greater than or equal to 1.

8. The display panel according to claim 7, wherein a plurality of subpixel units connected with the same data line in sequence are divided into G driving groups when driven, a number of the clock signals is H, each of the driving groups comprises F subpixel units, F=[H/G], and [H/G] denotes rounding H/G; and the gate drive circuit is further configured to enable F subpixel units in a Bth driving group to be driven in an order of $A_d$=B+(d−1)×G, $A_d$ denotes an order number of the subpixel unit which is driven for a dth time, B is a positive integer less than or equal to G, and d is a positive integer less than or equal to F.

9. The display panel according to claim 8, wherein the plurality of subpixel units connected with the same data line in sequence have at least a first color and a second color; and among the plurality of subpixel units connected with the same data line in sequence, the subpixel units of the first color have a minimum arrangement period of G1, the subpixel units of the second color have a minimum arrangement period of G2, and then G is a least common multiple of G1 and G2.

10. The display panel according to claim 7, wherein each of the shift-register-unit scanning group comprises 16 shift register units, the clock signals received by the 16 shift register units are a first clock signal to a sixteenth clock signal, and the first clock signal to the sixteenth clock signal have equal periods and equal duty ratios.

11. The display panel according to claim 10, wherein the period comprises 16 time units, and the first, fifth, ninth, thirteenth, third, seventh, eleventh and fifteenth clock signals are adjacent to each other in sequence in timing;

the second, sixth, tenth, fourteenth, fourth, eighth, twelfth and sixteenth clock signals are adjacent to each other in sequence in timing; and the first and second clock signals differ in timing by 8 time units.

12. The display panel according to claim 11, wherein the duty ratio is 9/20.

13. The display panel according to claim 7, wherein the display panel further comprises a data drive circuit in the peripheral region, and the data drive circuit is connected with the plurality of data lines and configured to supply the data signal to the subpixel unit array by means of a 2-point polarity switching approach.

14. The display panel according to claim 13, wherein the data signal provided by any one of the plurality of data lines has a same polarity, and the any one of the plurality of data lines has a zigzag wiring shape.

15. The display panel according to claim 9, wherein in each of the at least one shift-register-unit scanning group, a Lth shift register unit is provided at a first side of the display region, a Rth shift register unit is provided at a second side of the display region opposite to the first side; and L is 1, 2, 3, 4, 9, 10, 11 or 12, and R is 5, 6, 7, 8, 13, 14, 15 or 16.

16. A display device, comprising a display panel according to claim 1.

17. A driving method of the display panel according to claim 1, comprising:

providing the clock signals to the gate drive circuit to cause the gate drive circuit to generate the scanning signal, to enable the at least two subpixel units of the same color which are connected with the same data line and not adjacent to each other to display successively in timing.

18. The driving method according to claim 17, wherein a plurality of subpixel units connected with the same data line in sequence are divided into G driving groups when driven, a number of the clock signals is H, each of the driving groups comprises F subpixel units, F=[H/G], and [H/G] denotes rounding H/G; and the driving method further comprises: driving F subpixel units in a Bth driving group in an order of $A_d$=B+(d−1)×G, where $A_d$ denotes an order number of the subpixel unit which is driven for a dth time, B is a positive integer less than or equal to G and d is a positive integer less than or equal to F.

19. The driving method according to claim 18, wherein the plurality of subpixel units connected with the same data line in sequence have at least a first color and a second color;

among the plurality of subpixel units connected with the same data line sequentially, the subpixel units of the first color have a minimum arrangement period of G1, the subpixel units of the second color have a minimum arrangement period of G2; and the driving method further comprises: using a least common multiple of G1 and G2 as G.

20. The driving method according to claim 18, wherein G=4, H=16, and the driving method further comprises: driving the plurality of subpixel units connected with the same data line sequentially according to a sequence of following order numbers:

1, 5, 9, 13, 3, 7, 11, 15, 2, 6, 10, 14, 4, 8, 12 and 16.

* * * * *